O. J. TRENIS.
COMBINED IDENTIFICATION DEVICE, TAG SEAL CARRIER, AND FRONT AND REAR LIGHT FOR MOTOR VEHICLES.
APPLICATION FILED JUNE 17, 1916.
1,356,499.
Patented Oct. 19, 1920.
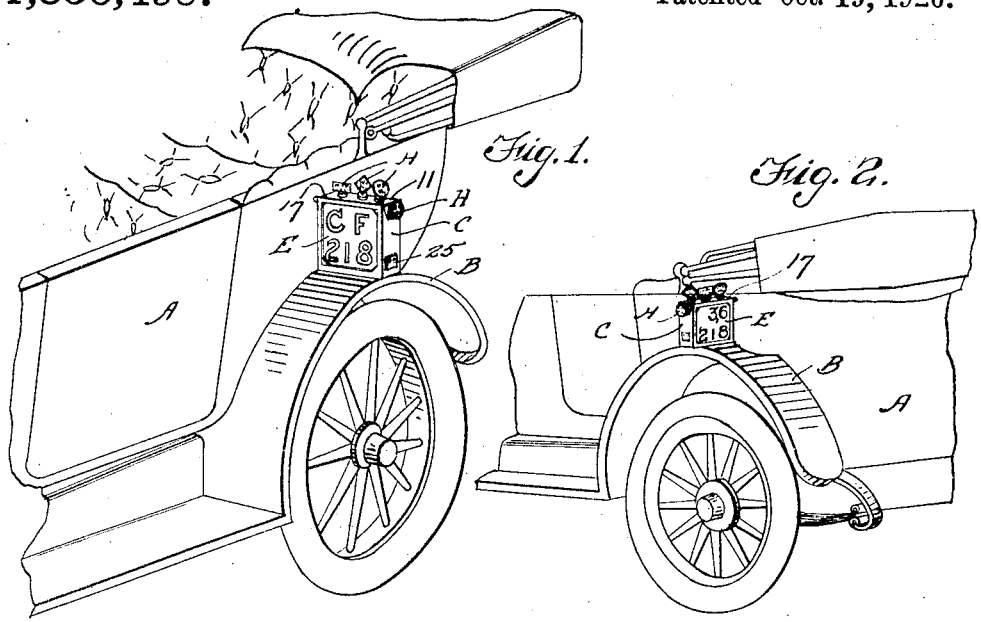
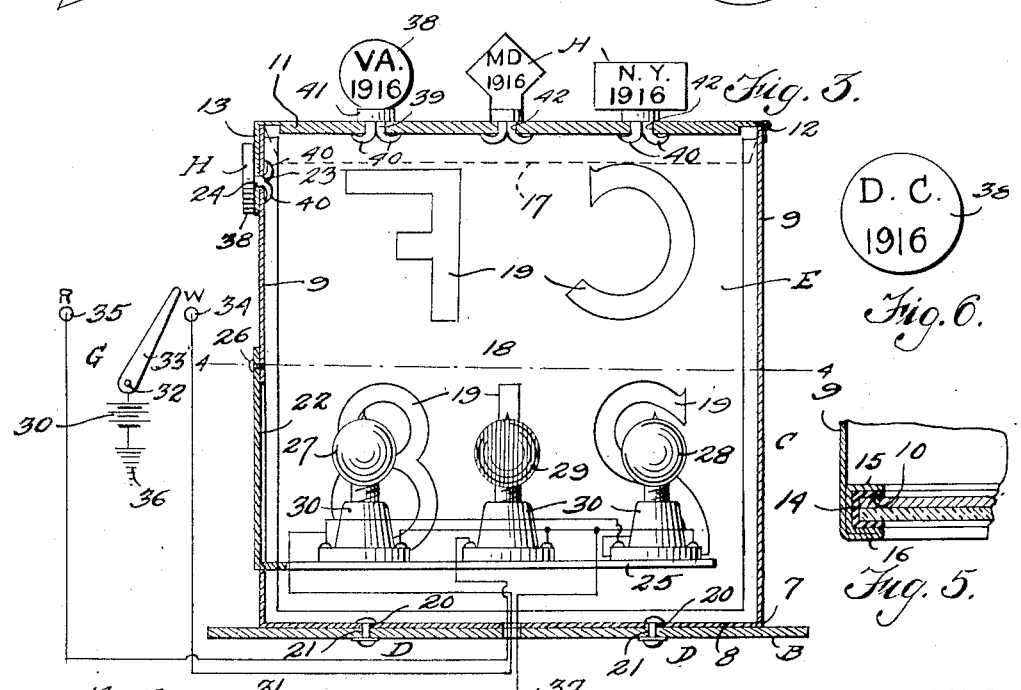
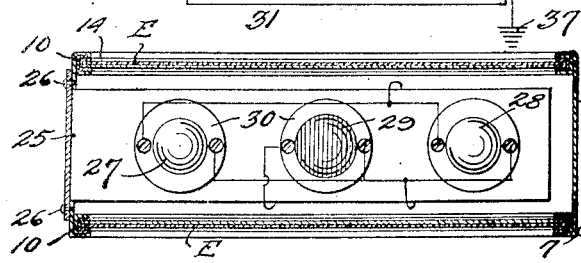
INVENTOR
Otis J. Trenis
By Lancaster & Alwing
his ATTORNEYS

UNITED STATES PATENT OFFICE.

OTIS J. TRENIS, OF WASHINGTON, DISTRICT OF COLUMBIA.

COMBINED IDENTIFICATION DEVICE, TAG-SEAL CARRIER, AND FRONT AND REAR LIGHT FOR MOTOR-VEHICLES.

1,356,499. Specification of Letters Patent. Patented Oct. 19, 1920.

Application filed June 17, 1916. Serial No. 104,322.

*To all whom it may concern:*

Be it known that I, OTIS J. TRENIS, a citizen of the United States, and resident of Washington, in the District of Columbia, have invented a certain new and useful Improvement in Combined Identification Devices, Tag-Seal Carriers, and Front and Rear Lights for Motor-Vehicles, of which the following is a specification.

My present invention relates to combined identification and safety devices for vehicles, and more particularly to a carrier for transparent numerals visible day and night, at the front and rear of the vehicle, said carrier adapted to effectively display tax seals of various States or sections.

The principal objects of my invention are, first to provide devices of the character described which may be attached to any type of vehicle and serve a dual function,—to display identification numbers at the front and rear of the vehicle, and front and rear lights, at night, operable to serve as a danger signal, as when stopping the vehicle or prior to turning from a usual course, preventing rear end collisions and other accidents; second, to provide a device of the character described including a box-like carrier for transparent numbers, illuminating means, etc., which is adapted to be permanently secured to a vehicle at the rear left side, and above the mud-guard, as are carried by motor vehicles, rendering the device non-transferable, eliminating dead numbers, and preventing a thief from changing the numbers to insure a "getaway" with a stolen vehicle; third, to provide a device of the character described adapted to be placed in a clear, conspicuous position with numerals visible at a great distance, at day and night, and at the front and rear of the vehicle, so that an officer instructed to be on the outlook may detect the particular vehicle at day or night as the vehicle is approaching him, and in which connection it is pointed out that the laws of some States now require merely a rear identification tag, illuminated at night, while others require a front and rear identification tag, with the rear tag illuminated at night; fourth, to provide a device of the character described, which in its normal position may be observed from the operator's seat to determine that it is properly illuminated at night, obviating the necessity of dash light, in circuit with rear lamps; fifth, to provide a device of the character susceptible of attachment to the rear left side of the vehicle, visible at front and rear of the vehicle, illuminated at night, enabling the driver of a vehicle passing in either direction to gage more accurately the safe distance in passing to prevent accident; sixth, to provide a device of the character described which may be illuminated at night at both the front and the rear, economizing in the fuel or energy used for illuminating purposes; and, to provide a device of the character described which will obviate the necessity of numerous identification tags or plates when the vehicle is used interstate, but which will effectively display tax seals securely held in place against unauthorized use.

Other objects of my invention will appear in the following detailed description, taken in connection with the accompanying drawing, forming a part of this specification, and in which drawing:

Figure 1 is a perspective view of the rear end portion of a vehicle, looking from the front toward the rear side thereof, and showing a device constructed according to my invention, applied thereto.

Fig. 2 is a view similar to Fig. 1 looking toward the rear left side, from the rear of the vehicle.

Fig. 3 is a central vertical sectional view through a device embodying my invention.

Fig. 4 is a sectional view on the line 4—4 of Fig. 3.

Fig. 5 is an enlarged detail view of an improved means for securing plates displaying identification numbers in connection with a suitable carrier.

Fig. 6 is a front elevation of a tax seal.

In the drawing, where similar characters refer to similar parts throughout the several views, A designates a vehicle including a mud-guard B at the rear left side thereof; C a box-like carrier positioned at the left rear side of the vehicle, above the mud-guard B; D, means for securing said carrier in said position; E, plates displaying identification numerals, as by means provided with opaque and transparent portions; F, illuminating means within carrier C; G, mechanism for controlling means F; and H, tax seals.

While I have herein shown the invention as applied to a motor vehicle, it is understood that this invention is susceptible of application to anything in or on which any person or thing is, or may be, carried, as a motor vehicle, wagon, boat, ship, or dirigible, without departing from the spirit or scope of my invention, excepting so far as the claims import.

For reasons hereinafter more specifically set forth, in the example shown, I have mounted the box-like carrier C upon the mud-guard B, at the crown thereof, and laterally of the rear left side of the vehicle A, said carrier being secured to the mud-guard as by rivets D, or may be made as a part of the mud-guard or vehicle.

Referring first to the carrier C, it comprises a U-shaped frame 7, including a base 8 and upright stems 9, in the example shown, said frame formed at its two faces, in any suitable manner, to provide ways 10 adjacent its faces, and open at the interior of the frame; a closure 11 for the open edge of frame 7, said closure hinged, as at 12, to one stem 9, and provided with a flap 13 to lie adjacent the opposite stem or side 9 of frame 7; and, a yieldable packing 14 in each way 10, if desired, for a purpose to be more fully set forth hereinafter. In the example shown, each way 10 is provided by bending the main body of the frame inwardly, to provide an inner flange 15 and an outer flange 16, the packing 14 being U-shaped in cross section and fitting between said flanges. In addition to the flap 13, the closure 11 may be provided with longitudinal flanges 17 disposed at each face of the carrier C.

As to the plates E, they may be made of any suitable material, preferably non-inflammable, such as glass, and provided with opaque portions 18, and transparent portions 19, said transparent portions being in the form of characters, such as letters or numerals, or both. These plates may comprise a single or a plurality of pieces arranged in juxta-posed relation, and should be of sufficient thickness to withstand any normal shock coming thereupon. The plates are slidable to fit into the ways 10, and preferably with the packing 14 interposed between the plates and the walls of ways 10. I prefer to make up the identification numbers of a letter and a number, or a plurality of letters and numerals, as shown in Fig. 1, to render the device applicable to vehicles, and to fit above the mud-guard thereof, without projecting laterally of the outer edge of the mud-guard. By this arrangement, the identification number may also be more clearly detected and remembered, in the example shown, the letter C, the third letter of the alphabet, representing numeral 3, and the letter F, the sixth letter in the alphabet, representing numeral 6. In practice, it has been found easier to remember a plurality of letters and numerals rather than the same number of characters wholly made up of numerals. The frame 7 may be provided with a plurality of perforations 20, as in its base 8, adapted to aline with perforations 21, in the example shown, formed in mud-guard B, said perforations to receive the means D, in the example shown, in the form of rivets. One side of the frame 7 may also be provided with an opening 22, for a purpose to be subsequently set forth, together with a perforation 23, adapted to aline with a perforation 24 in the flap 13 of closure 11.

Referring now to the illuminating means F, it may comprise an L-shaped support 25, one stem of which to extend transversely through opening 22, in frame 7, and the other stem to close the said opening, and adapted to be secured to frame 7, as by screws 26 carried by the support and having screw-threaded engagement with the one stem 9; lamps 27, 28, and 29 carried by support 25, said lamps in the example shown, being of the electric type, and supported by bases 30, secured to support 25; a generator or battery 30; and, suitable wiring 31, hereinafter more specifically described. It is preferred to provide white lamps 27 and 28 and a red lamp 29, and while I have shown in the present example, a plurality of lamps, it is to be understood that the invention is susceptible of use, embodying merely one lamp, if desired.

The mechanism G may comprise a switch 32 including the arm 33 and contacts 34 and 35. The battery or generator 30 is grounded as at 36, from one pole, the other pole being in conducting communication with switch arm 33. One pole of each lamp is grounded as at 37, while the other poles of lamps 28 and 27 are in conducting communication with switch point 34. The other pole of lamp 29, is in conducting communication with switch point 35. Thus, when the switch arm 33 is thrown into engagement with point 34, the white lamps 27 and 28 are illuminated, however, if the switch arm is thrown into engagement with point 35, merely the red lamp 29 is illuminated. If the switch arm is in engagement with neither point 34 or 35, the lamps are not illuminated. The means G may be disposed at any portion of the vehicle, under control of one of the passengers.

One of the principal objects of my invention is to provide a device for use on vehicles which is used interstate, but which require merely one identification number, that is, a different identification number for each vehicle. In order that the device may be susceptible of use for displaying tax seals for various States or districts, I have shown, by way of example, a plurality of tax seals supported by closure 11, in the example shown, these seals including a display portion 38, a stem 39, preferably polygonal in cross section; and, arms 40 extending from stem 39. If desired, the seals may also be provided with enlargements 41 intermediate stems 39 and display portion 38. The closure 11, or any other portion of the carrier C may be provided with a plurality of perforations 42 of a shape similar to the stems 39, and through which said stems extend with the display portion 38 exteriorly of the carrier. In the example shown, these perforations 42 are in the closure 11, disposing certain of the seals at the top of carrier C, where they are visible from both the front and rear of the vehicle. The display portion may contain abbreviations of the States and year for which tax has been paid, and the seals for various adjacent States, may be of different colors and also differ in shape, as is the practice in connection with tax seals now in common use. One tax seal may serve to retain the closure 11 against unauthorized removal of the plates E or tax seals H, the stems 39 of said tax seal extending through the alined perforations 23 and 24, hereinbefore described, with its arms 40 separated to engage the internal periphery of frame 7. Access may be gained to separate the arms 40 through the opening 22, a suitable tool (not shown in the drawing), being provided to separate said arms.

While I have herein shown the arms 40, adapted to be turned into engagement with the internal periphery of carrier C, it is to be understood that this is merely by way of example, since any suitable means or devices may be provided to retain the seals rigid with the carrier and against unauthorized displacement. The seals which are supported by closure 11 may be placed before the seal which serves to hold said closure against unauthorized displacement. The seals may be made of any suitable material, preferably coated with frangible material so that if any attempt is made to remove from the exterior of the carrier, the delineations on the display portions will chip away rendering them useless. When it is desired to replace the desired seals, they may be slipped off, as by use of a wire cutter, or other suitable tool, to engage beneath the enlargements 41 of the display portion 38.

When bringing the device into use, it is first permanently secured, preferably at the left rear side of the vehicle and when applied to a vehicle including a mud-guard at such portion, may be secured to the crown of the mud-guard. After the owner of the car has made proper application, and paid the necessary taxes, the tax seals are disposed in operative relation to the carrier C to be displayed therefrom. Any of the perforations 42 which are not filled, may be closed by means of rivets, so that water will not enter the interior of the carrier. After the tax seals have been disposed in operative relation to the carrier, excepting that which may be provided to retain the closure of the carrier against unauthorized removal, the plates E are positioned in ways 10, as hereinbefore described. This is followed by sealing the closure of the carrier, and the device is ready for use to display the identification numbers as well as tax seals, and if desired, to serve as means for providing rear and front lights, as well as signals. The signaling may be accomplished by manipulation of the switch 32, in the example shown, the white lights being illuminated during motion of the vehicle at a normal speed, and the red light being displayed as the vehicle slows down or comes to a stop. In this connection, it is to be observed that, as the vehicle is stationed near the curb, or side of the roadway, merely the red lamp may be illuminated, which furnishes a danger signal at night, visible at both the front and rear of the vehicle. One of the passengers of the car, has merely to glance at the left rear portion of the vehicle to determine whether or not the identification numbers are properly illuminated at night, it being obvious that if the plate displayed at the front portion of the vehicle is not illuminated, that at the rear is also not illuminated, that steps should be taken to comply with the law.

The law of the road is "keep to the right" and it is to be observed that a vehicle approaching another in opposite directions, at night, can be steered so as to pass each other at a safe distance, avoiding accident, the signal or identification numbers being displayed at the left hand side of the vehicle.

Changes in details may be made without departing from the spirit or scope of my invention; but,

I claim:—

1. In combination with a vehicle body, a casing, number plates within said casing, means permanently securing said casing to the left rear side of the vehicle for displaying said plates to the front and rear of the vehicle and to prevent removal of the casing from the body, a seal support confining said plates in said casing, and a tax seal sealing said support to the casing.

2. An identification means comprising a carrier, a number plate within said carrier, a seal support confining said plate within the carrier, and tax seals carried by said support and projecting above the carrier.

3. An identification means comprising a carrier, a number plate within said carrier, a supporting plate hinged to the carrier, and confining said number plate therein, said hinged supporting plate provided with a plurality of openings, tax seals, attaching stems on said seals extending through said openings to attach the seals to the hinged supporting plate.

4. An identification means comprising a carrier, a number plate within said carrier, a seal support confining said plate in the carrier, a tax seal sealing said support to said carrier, and tax seals carried by said support and projecting above the carrier.

OTIS J. TRENIS.